United States Patent
Zerafati et al.

(10) Patent No.: US 10,774,208 B2
(45) Date of Patent: Sep. 15, 2020

(54) HIGH IMPACT BLENDS OF VINYLIDENE FLUORIDE-CONTAINING POLYMERS

(71) Applicant: Arkema Inc., King of Prussia, PA (US)

(72) Inventors: Saeid Zerafati, Villanova, PA (US); Ramin Amin-Sanayei, Malvern, PA (US); James J. Henry, Downingtown, PA (US); Gregory S. O'Brien, Downingtown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/557,147

(22) PCT Filed: Mar. 10, 2016

(86) PCT No.: PCT/US2016/021651
§ 371 (c)(1),
(2) Date: Sep. 11, 2017

(87) PCT Pub. No.: WO2016/145135
PCT Pub. Date: Sep. 15, 2016

(65) Prior Publication Data
US 2018/0044515 A1    Feb. 15, 2018

Related U.S. Application Data

(60) Provisional application No. 62/131,514, filed on Mar. 11, 2015.

(51) Int. Cl.
| | | |
|---|---|---|
| *C08L 27/12* | (2006.01) | |
| *C08L 83/04* | (2006.01) | |
| *C08L 27/16* | (2006.01) | |
| *C09D 127/16* | (2006.01) | |
| *C08F 283/12* | (2006.01) | |
| *C08L 51/08* | (2006.01) | |

(52) U.S. Cl.
CPC .......... *C08L 27/16* (2013.01); *C09D 127/16* (2013.01); *C08F 283/12* (2013.01); *C08L 51/085* (2013.01); *C08L 2201/02* (2013.01); *C08L 2205/025* (2013.01); *C08L 2205/04* (2013.01); *C08L 2207/53* (2013.01)

(58) Field of Classification Search
CPC ............... C08L 27/16; C08L 2201/02; C08L 2205/025; C08L 2205/04; C08L 2207/53; C08L 51/085; C09D 127/16
See application file for complete search history.

(56) References Cited

U.S. PATENT DOCUMENTS

| | | | | |
|---|---|---|---|---|
| 3,541,039 A | * | 11/1970 | Whiton | C08L 27/16 524/311 |
| 5,587,424 A | * | 12/1996 | Langstein | C08L 27/12 525/416 |
| 5,919,852 A | * | 7/1999 | Peltz | C08K 3/24 524/406 |
| 2004/0054050 A1 | | 3/2004 | Pascal et al. | |
| 2009/0069488 A1 | | 3/2009 | Durali et al. | |
| 2011/0304208 A1 | | 12/2011 | Lee et al. | |
| 2012/0046416 A1 | * | 2/2012 | Pirri | C08F 265/06 525/199 |
| 2013/0317150 A1 | | 11/2013 | Wan et al. | |
| 2016/0095282 A1 | * | 4/2016 | Devisme | C08L 27/08 47/17 |
| 2018/0163041 A1 | * | 6/2018 | Abgrall | C08J 5/18 |

FOREIGN PATENT DOCUMENTS

| | | | |
|---|---|---|---|
| WO | WO 2005/103101 A1 | | 11/2005 |
| WO | WO2011/110365 | | 9/2011 |
| WO | WO2014-174197 | | 10/2014 |
| WO | WO-2015092282 A1 | * | 6/2015 |

OTHER PUBLICATIONS

Technical Data Sheet, Genioperl P52 Core-Shell Modifier, WACKER, Version 1.4, Jun. 11, 2014, 1 page.

* cited by examiner

*Primary Examiner* — Irina S Zemel
*Assistant Examiner* — Jeffrey S Lenihan
(74) *Attorney, Agent, or Firm* — Joanne Rossi

(57) ABSTRACT

The invention relates to blends containing polymers of vinylidene fluoride, having low ductile-brittle transition temperatures and having excellent low temperature impact properties while maintaining the positive aspects of unmodified vinylidene fluoride-containing polymers. The blends of this invention are produced by adding a core-shell impact modifier (CSIM) comprised of a polysiloxane core and a shell compatible with vinylidene fluoride-containing polymer. The blends are further characterized by the presence of a heterogeneous copolymer composition comprised of two or more distinct phases and/or at least one flame and smoke suppressant. The preparation of these new blends can be done by conventional thermoplastic compounding techniques such as twin screw compounding; alternatively, the CSIM can be introduced earlier, such as in the latex. The unique properties of the new blends make them useful in end-use applications where those properties provide performance advantages, such as in wires & cables and in oil and gas applications.

17 Claims, 2 Drawing Sheets

HIGH IMPACT BLENDS OF VINYLIDENE FLUORIDE-CONTAINING POLYMERS

This application claims benefit, under U.S.C. § 119 or § 365 of PCT Application Number PCT/US2016/021651, filed Mar. 10, 2016; and US Provisional Application No. 62/131,514, filed Mar. 11, 2015; said applications incorporated herein by reference.

FIELD OF THE INVENTION

The invention relates to compositions containing blends of vinylidene fluoride-containing polymers and core-shell impact modifiers having polysiloxane-based cores, methods of making such blends, articles manufactured using such blends, as well as methods for improving the impact properties of vinylidene fluoride-containing polymers using core-shell impact modifiers.

BACKGROUND OF THE RELATED ART

Polyvinylidene fluoride (PVDF) is a highly crystalline engineering thermoplastic offering an excellent combination of properties including but not limited to high chemical corrosion resistance, excellent abrasion resistance, high oxidative resistance and heat resistance. In addition, PVDF resins are unaffected by UV radiation, providing exceptional weathering resistance, have good light transmittance in films and are resistant to creep under mechanical stress. Another important property of PVDF resins is their inherent flame retardancy with low smoke generation during a fire event. PVDF resins can be used in many forms including but not limited to molded parts, extruded profiles, and as protective coatings.

Vinylidene fluoride is commonly copolymerized with comonomers such as hexafluoropropylene (HFP) to produce products having lower flexural modulus. Such PVDF copolymers, in general, have lower levels of crystallinity compared to homopolymers, with properties shifting as would be expected as crystallinity is reduced. In general, PVDF copolymers, such as copolymers with hexafluoropropylene (HFP), provide improvement in ductility and low temperature performance while maintaining much of the exceptional properties associated with PVDF resins. Unfortunately, the effects of HFP addition on improving low temperature ductility are limited. Vinylidene fluoride-HFP copolymers tend to have ductile-brittle transition temperatures (DBTTs) ranging between 0° C. and at best down to −15° C.

For many applications, a lower DBTT down to −40° C. or below is required, which is verified by performing impact tests at these low temperatures. Vinylidene fluoride-HFP copolymers as a class do not meet these low temperature impact requirements. In these cases, core shell impact modifiers (CSIMs) can be added to PVDF through various techniques to achieve low temperature performance. However, the addition of the traditional CSIMs to vinylidene fluoride-containing polymers compromises some of the excellent properties of these polymers. For example MBS modifiers with butadiene cores, while efficient in impact modification, have very poor weathering properties and oxidation resistance. All-acrylic impact modifiers compromise the flame properties of the vinylidene fluoride-containing polymer and are not as efficient as MBS based impact modifiers due to their relatively high core Tg.

BRIEF SUMMARY OF THE INVENTION

Surprisingly, it has now been found that the use of a CSIM comprised of a polysiloxane core with a shell that is compatible with the vinylidene fluoride-containing polymer (such as an acrylate shell), at a desired ratio and composition, can provide a significant reduction in the DBTT of said vinylidene fluoride containing polymer, while at the same time maintaining clarity, weathering resistance, chemical resistance and flame resistance. Blends of vinylidene fluoride-HFP copolymers with CSIMs containing polysiloxane cores have been discovered to be capable of maintaining UL94 V0 flame retardancy rating.

One aspect of the invention provides a resin composition comprised of a vinylidene fluoride-containing polymer and a core-shell impact modifier comprised of a polysiloxane core and a shell of a non-elastomeric polymeric material compatible with the vinylidene fluoride-containing polymer. The resin composition further has at least one of the following characteristics a) or b):

a) the resin composition is additionally comprised of at least one flame and smoke suppressant;

b) the vinylidene fluoride-containing polymer is a heterogeneous copolymer composition comprised of two or more distinct phases.

For example, the resin composition may comprise at least one flame and smoke suppressant and a vinylidene fluoride-containing polymer which is a heterogeneous copolymer composition comprised of two or more distinct phases. In another embodiment, the resin composition does not contain a flame and smoke suppressant, but does contain a vinylidene fluoride-containing polymer which is a heterogeneous copolymer composition comprised of two or more distinct phases. In still another embodiment, the resin composition does not contain a vinylidene fluoride-containing polymer which is a heterogeneous copolymer composition comprised of two or more distinct phases, but does contain at least one flame and smoke suppressant.

In one embodiment, the vinylidene fluoride-containing polymer may be a copolymer of vinylidene fluoride.

The vinylidene fluoride-containing polymer, in one particularly advantageous embodiment of the invention, may be a heterogeneous copolymer composition comprised of two or more distinct phases. One phase may be a continuous polyvinylidene fluoride phase, while another phase may be co-continuous or non-continuous and may be a copolymer of vinylidene fluoride and at least one comonomer (such as hexafluoropropylene or perfluoroalkyl vinyl ether).

In a further embodiment, the resin composition may be comprised of 60 to 98 parts by weight vinylidene fluoride-containing polymer and 2 to 40 parts by weight core-shell impact modifier, the total amount of vinylidene fluoride-containing polymer and core-shell impact modifier being 100 parts by weight.

The shell may be an acrylate shell, in one embodiment of the invention.

In additional embodiments of the invention, the polysiloxane core may be cross-linked and/or the shell may be grafted onto the polysiloxane core.

In one embodiment, the shell is cross-linked. In another embodiment, the shell is comprised of a polymer having one or more types of functional groups selected from the group consisting of epoxy functional groups, anhydride functional groups and carboxylic acid functional groups. The shell may be both cross-linked and functionalized.

The core-shell impact modifier may have a particle size of from 10 to 500 nm, in one embodiment of the invention.

In yet another embodiment, the core-shell impact modifier may be comprised of 50 to 90 parts by weight polysiloxane core and 10 to 50 parts by weight shell, the total amount of polysiloxane core and shell being 100 parts by weight.

The non-elastomeric polymeric material comprising the shell may be a homopolymer or copolymer of one or more (meth)acrylates, optionally copolymerized with one or more ethylenically unsaturated comonomers other than (meth) acrylates). In one embodiment, the non-elastomeric polymeric material may be a homopolymer of methyl methacrylate or a copolymer of methyl methacrylate and one or more ethylenically unsaturated monomers selected from the group consisting of vinyl aromatic monomers, vinyl cyanides, unsaturated acids and anhydrides, and (meth)acrylamides.

The polysiloxane, according to one embodiment of the invention, may be a polydimethylsiloxane.

The resin composition may additionally comprise at least one flame and smoke suppressant, such as flame and smoke suppressants selected from the group consisting of tungstates, silicates, molybdates and phosphorus-containing compounds.

The resin composition, in a further aspect of the invention, may additionally comprise at least one plasticizer, which may be a polymeric plasticizer.

In one aspect of the invention, an article is provided which is comprised of at least one component comprised of a resin composition in accordance with any of the above-mentioned embodiments and at least one component comprised of a non-polymeric material (such as metal, for example).

A still further embodiment of the invention provides an article selected from the group consisting of wires, cables, conduit, piping, tanks, pumps, tubing, coatings, tower packing, solar panels, permeable membranes, batteries, lined vessels, nozzles, valves, resin-coated metal articles, electrical and electronic devices and fabrics, wherein the article is comprised, at least in part, of a resin composition in accordance with any of the above-mentioned embodiments.

A wire or cable having a plurality of components is provided in an additional embodiment of the invention, wherein at least one of the components is comprised of a resin composition in accordance with any of the above-mentioned embodiments and at least one of the components is comprised of a material other than a resin composition in accordance with the present invention. In one advantageous embodiment, the resin composition is comprised of at least one flame and smoke suppressant.

A method of improving the impact properties of a vinylidene fluoride-containing polymer is also provided according to one aspect of the invention, wherein the method comprises blending a core-shell impact modifier comprised of a polysiloxane core and a shell of a non-elastomeric polymeric material compatible with the vinylidene fluoride-containing polymer. In a particularly preferred embodiment of this method, the vinylidene fluoride-containing polymer is a heterogeneous copolymer composition comprised of two or more distinct phases.

The present invention, in a further exemplary non-limiting embodiment, provides a method of making a resin composition in accordance with any of the above-described embodiments, wherein the method comprises compounding a vinylidene fluoride-containing polymer and a core-shell impact modifier or blending a latex of a vinylidene fluoride-containing polymer and a latex of a core-shell impact modifier, wherein the core-shell impact modifier is comprised of a polysiloxane core and a shell of a non-elastomeric polymeric material compatible with the vinylidene fluoride-containing polymer.

DETAILED DESCRIPTION OF CERTAIN EMBODIMENTS OF THE INVENTION

Vinylidene Fluoride-Containing Polymer

Figure 1:
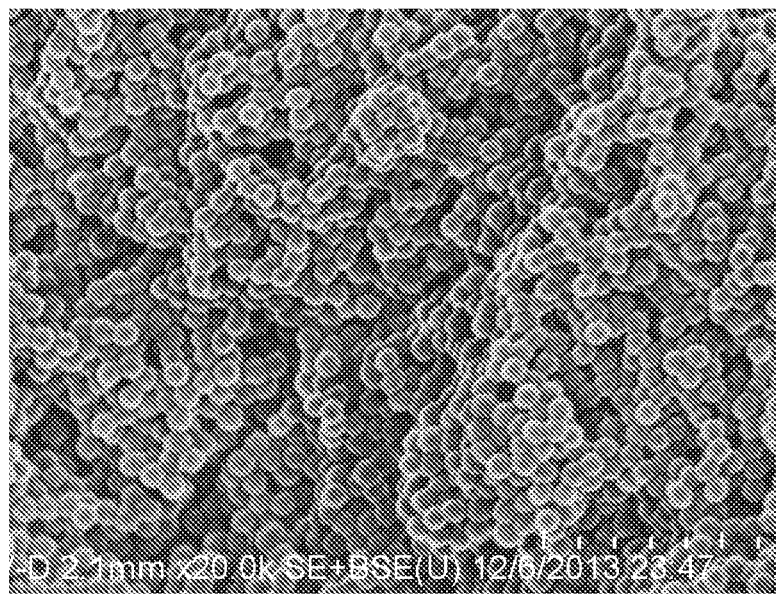
FIG. 1: Is an SEM of the spray-dried powder blend of Example 11 (silicon particles without any shell)

The compositions of the present invention comprise at least one vinylidene fluoride-containing polymer. The term vinylidene fluoride-containing polymer, as used herein, denotes any polymer that has in its chain at least one monomer which is vinylidene fluoride (sometimes also referred to as vinylidene difluoride or VDF). The vinylidene fluoride may be homopolymerized or copolymerized with one or more other fluoromonomers, examples of which include, but are not limited to vinyl fluoride; trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro (1,3-dioxole); and perfluoro(2,2-dimethyl-1,3-dioxole) (PDD). In various embodiments, the vinylidene fluoride-containing polymer is a copolymer of vinylidene fluoride and at least one comonomer selected from the group consisting of chlorotrifluoroethylene, hexafluoropropylene, trifluoroethylene and tetrafluoroethylene and combinations thereof. In one embodiment, the copolymer is comprised of only vinylidene fluoride and hexafluoropropylene.

Exemplary PVDF copolymers and terpolymers useful as the vinylidene fluoride-containing polymer in the invention include those in which vinylidene fluoride units comprise greater than 40 percent of the total weight of all the monomer units in the polymer, and more preferably, comprise greater than 70 percent of the total weight of the units. Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene.

In one embodiment, up to 30%, preferably up to 25%, and more preferably up to 15% by weight of hexafluoropropene (HFP) units and 70%, preferably 75%, more preferably 85% by weight or more of VDF units are present in the vinylidene fluoride-containing polymer.

In one aspect of the invention, the vinylidene fluoride-containing polymer used in the invention has a high molecular weight. By high molecular weight, as used herein, is meant vinylidene fluoride-containing polymer having a melt viscosity of greater than 1.0 kilopoise, preferably greater than 5 Kp, and preferably in the range from 5 to 50 Kp, and more preferably from 5 to 30 Kp, according to ASTM method D-3835 measured at 450° F. (232° C.) and 100 sec$^{-1}$.

The vinylidene fluoride-containing polymer used in the invention is generally prepared by means known in the art, such as aqueous free-radical emulsion polymerization (although suspension, solution and supercritical $CO_2$ polymerization processes may also be used). In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride and optionally other monomer(s) is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of monomer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably the vinylidene fluoride-containing polymer emulsion is fluorosurfactant free, with no fluorosurfactants being used in any part of the polymerization. Non-fluorinated surfactants useful in the polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The polymerization results in a latex generally having a solids level of 10 to 60 percent by weight, preferably 10 to 50 percent, and having a latex weight average particle size of less than 500 nm, preferably less than 400 nm, and more preferably less than 300 nm. The weight average particle size is generally at least 20 nm and preferably at least 50 nm. A minor amount of one or more other water-miscible solvents, such as ethylene glycol, may be mixed into the latex to improve freeze-thaw stability.

The latex of vinylidene fluoride-containing polymer may be dried to a powder by means known in the art, such as, but not limited to, spray drying, freeze-drying, coagulating, and drum drying. The dried powder of vinylidene fluoride-containing polymer may have an average particle size of from 0.5 to 200 microns, or from 1 to 100 microns, or from 2 to 50 microns, or from 3 to 20 microns. The vinylidene fluoride-containing polymer may also be utilized in latex form, without an initial drying step, to prepare the mixture with the core-shell impact modifier, which may also be in latex form.

Especially useful poly(vinylidene difluoride) resins include, but are not limited to, KYNAR® homopolymer resins and KYNARFLEX® copolymer resins from Arkema Inc.

In one especially advantageous embodiment of the invention, the vinylidene fluoride-containing polymer employed is a heterogeneous copolymer composition. In the context of the present invention, "heterogeneous" means a copolymer composition having two (or more) distinct phases, with a polyvinylidene fluoride continuous phase and a copolymer of vinylidene fluoride and at least one additional comonomer (such as hexafluoropropylene and/or perfluoroalkyl vinyl ether, e.g., perfluoromethyl vinyl ether or perfluoroethyl vinyl ether) that forms a non-continuous or co-continuous phase. Heterogeneous copolymer compositions useful in the present invention are described, for example, in U.S. Pat. Nos. 5,093,427; 6,187,885; 7,700,700; 7,863,384; and 8,501,862, United States Published Patent Application No. 2004/0167282 and in U.S. Provisional Application No. 62/113,690, filed Feb. 9, 2015, the entire disclosures of each of which are incorporated herein by reference in their entirety for all purposes.

Core-Shell Impact Modifiers

Core-shell impact modifiers useful in the present invention may be characterized as being comprised of a polysiloxane core and a shell compatible with the vinylidene fluoride-containing polymer. As used herein, the phrase "compatible with the vinylidene fluoride-containing polymer" means that the polymer used to form the shell is at least partially miscible with the vinylidene fluoride-containing polymer. Core-shell impact modifiers are particles that generally have a core comprised of a polymeric material having elastomeric or rubbery properties (i.e., a glass transition temperature less than about 0° C., e.g., less than –30° C., or less than –50° C. or less than –70° C. or less than –90° C. and low crystallinity measured by DSC of <5 J/g) surrounded by a shell comprised of a non-elastomeric polymeric material (i.e., a thermoplastic or thermoset/cross-linked polymer having a glass transition temperature greater than ambient temperatures, e.g., greater than 25° C. or greater than 50° C.). In the case of the present invention, the core is comprised of a polysiloxane (also sometimes referred to as a polyorganosiloxane, organosilicon polymer or silicone). The polysiloxane may be an elastomer, such as polydimethylsiloxane, which may be cross-linked. For example, the polysiloxane may be comprised of repeating units corresponding to the structure [OSiR$^1$R$^2$], wherein R$^1$ and R$^2$ are the same or different and are C1-C6 alkyl groups or aromatic groups such as methyl, ethyl or phenyl. The shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature and providing a polymer which is compatible with the vinylidene fluoride-containing polymer component of the blends of the present invention. In one desirable embodiment of the invention, the shell polymer is an acrylate, i.e., a homopolymer or copolymer of one or more (meth)acrylates (in particular, alkyl (meth)acrylates, especially C1-C6 alkyl (meth)acrylates such as methyl methacrylate), which may optionally be copolymerized with one or more other types of ethylenically unsaturated monomers, such as vinyl aromatic monomers (e.g., styrene), vinyl cyanides (e.g., acrylonitrile), unsaturated acids and anhydrides (e.g., acrylic acid, methacrylic acid), (meth)acrylamides, and the like. The shell polymer may be, for example, a methyl methacrylate homopolymer or a copolymer of methyl methacrylate and at least one other ethylenically unsaturated comonomer; in one embodiment, the shell polymer is a homopolymer or copolymer comprised of at least 80% by weight methyl methacrylate. The polymer or copolymer used in the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. The outer surface of the shell may be functionalized with groups such as carboxylic acid groups, anhydride groups and/or epoxy groups, which may be introduced through grafting or during polymerization of the shell material using unsaturated functional monomers such as anhydrides of unsaturated carboxylic acids, unsaturated carboxylic acids and unsaturated epoxides (e.g., maleic anhydride, (meth)acrylic acid, glycidyl methacrylate). The particle may be comprised of more than two layers (e.g., a central core of one polysiloxane may be surrounded by a second core of a different polysiloxane or the polysiloxane-containing core may be surrounded by two shells of different composition or the particle may have the structure soft core, hard shell, soft shell, hard shell). In one embodiment of the invention, the rubber particles used are comprised of a core comprised of polysiloxane and at least two concentric shells having different chemical compositions and/or properties. Either the core or the shell or both the core and the shell may be crosslinked (e.g., ionically or covalently). The shell may be grafted onto the core. The polymer comprising the shell may bear one or more different types of functional groups (e.g., epoxy groups, anhydride groups, carboxylic acid groups) that are capable of interacting with other components of the compositions of the present invention. The particles of core-shell impact modifier may, for example, have a primary particle size of from 50 to 1000 nm. Typically, the weight amount of the core component of the core-shell impact modifier will be at least as much as the weight amount of the shell component. For example, the core-shell impact modifier may comprised of 50 to 90 parts by weight polysiloxane core and 10 to 50 parts by weight shell or 55 to 85 parts by weight polysiloxane core and 15 to 45 parts by weight shell or 60 to 80 parts by weight polysiloxane core and 20 to 40 parts by weight shell, the total amount of polysiloxane core and shell being 100 parts by weight.

Methods of preparing impact modifiers having a core-shell structure, including a polysiloxane core, are well-known in the art and are described, for example, in U.S. Pat. Nos. 5,223,586; 6,147,142; 6,890,993; and 7,803,461 and published U.S. application Nos. 2005-0124761 and 2007-0213474, each of which is incorporated herein by reference in its entirety for all purposes. Core-shell impact modifiers having a polysiloxane core are also available from several commercial sources. The following core-shell impact modifiers are suitable for use in the present invention, for example: the core-shell impact modifiers available in powder form from Wacker Chemie under the tradename GENIOPERL®, including GENIOPERL® P22, P23, P52 and P53.

Blends of Vinylidene Fluoride-Containing Polymers and Core-Shell Impact Modifiers An amount of at least one core-shell impact modifier having a polysiloxane core is combined with at least one vinylidene fluoride-containing polymer which is effective to improve at least one property of the vinylidene fluoride-containing polymer, in particular at least one impact property of the vinylidene fluoride-containing polymer, without degrading other key properties delivered by vinylidene fluoride polymers and copolymers such as chemical resistance, weathering resistance, and flame resistance. For example, the resulting blended resin composition may be comprised of 70 to 98 parts by weight vinylidene fluoride-containing polymer and 2 to 30 parts by weight core-shell impact modifier or 75 to 95 parts by weight vinylidene fluoride-containing polymer and 5 to 25 parts by weight core-shell impact modifier, the total amount of vinylidene fluoride-containing polymer and core-shell impact modifier being 100 parts by weight.

The blends in accordance with the present invention may be obtained by adapting compounding techniques known in the polymer art, in particular methods wherein the components are intimately mixed while being heated in the absence of any solvent or water. For example, twin screw compounding (e.g., a twin screw compounding extruder) may be utilized. Processing may be carried out by mixing in the melt, using heated mixing units maintained at suitable temperatures. Alternately, the PVDF and the core-shell impact modifier can be in the form of powders that are dry-blended together to form a homogeneous powder blend. In an alternative approach, a latex of a vinylidene fluoride-containing polymer may be combined with a latex of a core-shell impact modifier, with the resulting blended latex either used in the latex form, primarily as a coating, or being dried to provide a resin composition in accordance with the invention. Blends formed from a mixture of the latexes that is then dried, such as by co-spray drying forms powders in which the PVDF contains little (less than 10 weight percent, and preferably less than 5 weight percent) or no agglomerates. The PVDF average particle size in the co-spray dried blend is generally less than 500 nm, preferably less than 300 nm, and more preferably less than 250 nm. Moreover, the core-shell particles and PVDF particles in the co-spray dried blend form an intimate blend, in which the core-shell particles are found associated on the surface of the PVDF particles. When the PVDF is spray-dried separately, the agglomerate PVDF particles formed generally have average particle size of from 0.5 to 200 microns, preferably from 1 to 100 microns, more preferably from 2 to 50 microns, and most preferably from 3 to 20 microns. The blend composition may be in any physical form suitable for further processing into a finished article comprising the blend composition; for example, the blend composition may take the form of a powder or pellets.

In one embodiment of the invention, a concentrate or master batch comprised of vinylidene fluoride-containing polymer and core-shell impact modifier (possibly containing one or more additional components as well) may be prepared, for example in pellet form, with the concentrate or master batch containing a relatively high proportion of the core-shell impact modifier. The concentrate or master batch may then be subsequently blended or compounded with additional vinylidene fluoride-containing polymer to provide a resin composition having a desired lower level of core-shell impact modifier.

Additional Components of the Inventive Blends

The blend compositions of the present invention may also contain, in addition to vinylidene fluoride-containing polymer and core-shell impact modifier, various adjuvants and additives, including any of such substances known in the polymer art, such as plasticizers, lubricants, pigments, colorants, stabilizers, anti-oxidants, processing aids, fillers (including conductive fillers), fibers, waxes, reinforcements, antistatic agents, antimicrobial agents, fire and flame retardants, foaming agents (blowing agents) and solvents.

In one embodiment of the invention, the blend composition is formulated to contain at least one polymeric plasticizer. Suitable polymeric plasticizers include the products of the reaction and condensation of a carboxylic diacid (in particular, phthalic acid, adipic acid, sebacic acid, and the like) with a diol (ethylene glycol, propylene glycol, butanediol, hexanediol, and the like) or of a mixture of various carboxylic diacids with one or more diols. Exemplary polymeric plasticizers include polyphthalates and polyadipates.

In one embodiment, the blend composition additionally comprises at least one flame and smoke suppressant. Suitable flame and smoke suppressants include, for example, inorganic substances such as tungstates, molybdates and silicates as well as phosphorus-containing compounds (which may be organic or inorganic phosphorus-containing compounds). Illustrative suitable flame and smoke suppressants include, but are not limited to, calcium tungstate, calcium molybdate, aluminum silicates and the like and combinations thereof. Exemplary phosphorus-containing compounds include, but are not limited to, organic and inorganic phosphates, phosphonates and phosphinates, as well as red phosphorus. Other useful flame and smoke suppressants may include alumina trihydrate, magnesium hydroxide, ammonium molybdate, antimony oxide, molybdenum oxide, zinc borates, and zinc stannate. The flame and smoke suppressant(s) may be incorporated into the blend composition at a loading, for example, of 0.02 to 3.0 percent by weight or 0.05 to 2.0 percent by weight, based on the total combined weight of the vinylidene fluoride-containing polymer and core-shell impact modifier.

Uses

The blend compositions of the present invention may be produced in any suitable physical form, such as, for example, pellets, powders or latexes, and then formed into a suitable shape using any conventional thermoplastic forming technique such as injection molding, extrusion, coating or the like. For example, compositions of the present invention may be shaped into molded parts, or extruded profiles or utilized as protective coatings (for metal, for example). The articles formed from the inventive composition may be self-supporting, or may be supported by another material or component. Exemplary articles include, for example, articles selected from the group consisting of jacketings, primary layers, buffer layers and strength members for wire or cable; filtration membranes; battery separators; foamed articles; tubes, films, sheets, rods, or fibers; gaskets; umbilicals and risers for oil and gas applications; oil and gas tank liners; tubing, bags and containers for sterile uses, pharmaceutical production and distribution, food and beverage contact, and biological applications; corrosion resistant powder coatings for metal substrates; and extruded sheet linings for tank fabrication on metal or as a dual laminate.

The invention compositions are especially useful for manufacturing articles which are to be exposed to relatively low temperatures (e.g., temperatures below 0° C.), where it is desired to provide enhanced impact properties. Suitable end use markets include, for example, the wire and cable industry (e.g., the compositions may be used as coatings and/or insulation for wire and cable or as cable or wire conduits) and in oil and gas applications (as piping, tanks, pumps, tubing, coatings, tower packing, for example). Other uses include, but are not limited to, solar panels (as protective backsheets), membranes (for water purification, for example), lithium ion battery binders, automotive and other transportation applications, vessel linings, films, nozzles, valves, monofilament fabrics and the like. Pipes for chemical drainage, fuel transfer, or chemical transfer and plenum conduits are other applications for which the blend compositions could be useful.

For example, a blend composition in accordance with the present invention may be used to prepare an insulation layer for a wire or cable product. A metal wire or plurality of wires or other electrical conductor may be encased by an outer layer or coating comprised of the blend composition. The cable product may be, for example, a copper (electrical) or fiber (fiber optic) cable construction. Typical cable constructions are taught, for example, in U.S. Pat. No. 4,804,702. The components of a cable may include a jacket, primary insulation or a shield tape, and may include various subcomponents such as a strength member, film, buffer, separator, pull cord, or sub-jacket, any one or more of which may be made of a blend composition in accordance with the present invention.

In a further embodiment, the blend composition of the present invention, in particular a composition comprised of at least one flame and smoke suppressant, is utilized in a cable conduit. The cable conduit generally includes a jacket that defines a hollow passageway for receiving at least one cable, wherein the jacket is comprised of a blend composition in accordance with the present invention. The term "cable" may refer to a single insulated conductor, or a group of conductors insulated from each other and forming a stranded assembly that may be further insulated by outside wrappings, such as, for example, metal wire (e.g., copper wire), telephone line, fiber optic cable, telecommunications cable, electrical transmission/distribution lines, lines for promoting support of elevated structures (e.g., guide wires), etc. Signals carried by a cable may include electrical and/or optical signals.

EXAMPLES

Example 1

Silicone CSIM Effects on Physical/Mechanical Properties

Kynarflex® PVDF 2750-01 (a polyvinylidene fluoride/hexafluoropropene copolymer of Arkema, Inc.) was blended with 5, 10 and 20% Genioperl® P52 CSIM (a product copolymer of Wacker Chemie). Kynarflex® 3120-50 (a polyvinylidene fluoride/hexafluoropropene copolymer of Arkema, Inc.) was blended with 5, 10, 15 and 20% Genioperl® P52 CSIM and Kynarflex® PVDF 2850-00, 2800-00 and 2500-00 (a product of Arkema, Inc.) were blended with 5, 10, 15, 20 and 25% Genioperl® P52 CSIM (a product of Wacker Chemie). In each case, neat (unblended) Kynarflex® resin was used as a control. A Leistritz 18 mm twin screw extruder with specific mixing screws was used for the blending operation. The temperature profile and machine settings that were used are set forth in Table 1.

TABLE 1

| Temperature Profile (° C.) | | | | | | | | Machine Settings | | |
|---|---|---|---|---|---|---|---|---|---|---|
| Zone 1 (feed) | Zone 2 | Zone 3 | Zone 4 | Zone 5 | Zone 6 | Zone 7 | Zone 8 (die) | Screw RPM | Vacuum (in/Hg) | Pelletizer Setting |
| 150 | 190 | 200 | 210 | 210 | 220 | 220 | 220 | 250 | 3 | 8.4 |

The extruder was set up with a single-hole strand die 0.25 inches in diameter leading into a 6 foot cooling bath of 64° F. water. A Scheer Bay 20 blade pelletizer with an analog speed controller was used to cut the strands into pellets.

After the blends were made, they were injection molded into ASTM D638 ⅛" thick Type 1 tensile bars and ASTM D790 ⅛" thick flex bars using a Sumitomo SE75DUZ injection molding machine. The mold used to make the bars was kept at 120° F. via a MOKON water circulator. The temperature profile used for the injection molding process is set forth in Table 2. The machine parameters are in Table 3.

TABLE 2

| Temp Profile (° C.) | | | | | | |
|---|---|---|---|---|---|---|
| Zone 1 (feed) | Zone 2 | Zone 3 | Zone 4 | Zone 5 | Zone 6 (nozzle) | Mold Temp (° F.) |
| 210 | 220 | 220 | 230 | 230 | 235 | 120 |

TABLE 3

| Shot Size (mm) | Transfer Position (mm) | Two-Stage Injection Speed (mm/s) | Screw RPM | Back Pressure (psi) | Pack/Hold Pressure (psi) | Pack/Hold Time (s) | Cooling Time (s) |
|---|---|---|---|---|---|---|---|
| 104.0 | 27.0 | 110/50 | 100 | 400 | 5000/3500 | 17/11 | 20 |

AFM micrograph images of a 90/10 blend of Kynarflex® resin and Genioperl® P52 CSIM indicated that the dispersion of the CSIM in the vinylidene fluoride-containing polymer matrix was excellent.

Physical Testing:

Molded samples were used to measure tensile and elongation, flexural properties and Izod impact strength according to ASTM standards.

Tensile and Flexural Modulus Tests

Tensile Testing using Injection Molding type I bars are tested using ASTM D638 method (Tensile Properties of Plastics) with a 2,000 lb load cell at a 4.5 inch grip separation, a speed of 2"/min on Instron 4202 testing frame. Flexural modulus tests use ASTM D790 method (Standard Test Methods for Flexural Properties) from a flex bar or flex compression molded fixture. The flexural modulus test is run at a 0.05"/min speed with a 100 lb load cell and uses the Instron 4201 testing frame. This testing is done using the Blue Hill 2 software from Instron.

Addition of Genioperl® P52 CSIM up to levels of 20% in Kynarflex® resins shows almost no change in stress at break and only a nominal lowering of flexural modulus. Surprisingly the addition of Genioperl® P52 CSIM at the levels tested does not appear to drastically effect T&E properties.

| Material | Silicone Impact Modifier P52 | Break Stress (psi) | Strain at Break (%) | Automatic Young's Modulus (psi) |
|---|---|---|---|---|
| Kynar® 2750 | 0% Silicone | 3510.0 | 421.8 | 71687.0 |
| Kynar® 2750 | 5% Silicone | 3756.0 | 473.9 | 68615.0 |
| Kynar® 2750 | 10% Silicone | 3885.0 | 454.0 | 68233.0 |
| Kynar® 2750 | 20% Silicone | 3685.0 | 347.9 | 66507.0 |
| Kynar® 3120-50 | 0% Silicone | 3539 | 193 | 117433 |
| Kynar® 3120-50 | 10% Silicone | 3662 | 272 | 101842 |
| Kynar® 3120-50 | 15% Silicone | 3636 | 267 | 95719 |
| Kynar® 3120-50 | 20% Silicone | 3545 | 236 | 91788 |

| Material | Silicone Impact Modifier P52 | Break Stress (psi) | Strain at Break (%) | Flexural Modulus (psi) |
|---|---|---|---|---|
| Kynar® 2850 | 0% Silicone | 4076 | 53.5 | 150559 |
| Kynar® 2850 | 5% Silicone | 4168 | 77.4 | 139618 |
| Kynar® 2850 | 10% Silicone | 4508 | 96.7 | 128828 |
| Kynar® 2850 | 15% Silicone | 4506 | 121.5 | 117521 |
| Kynar® 2850 | 20% Silicone | 4554 | 133.2 | 100801 |
| Kynar® 2850 | 25% Silicone | 4439 | 143.2 | 94434 |
| Kynar® 2800 | 0% Silicone | 3961 | 270.5 | 74230 |
| Kynar® 2800 | 5% Silicone | 3936 | 272.2 | 72102 |
| Kynar® 2800 | 10% Silicone | 3966 | 290.4 | 71388 |
| Kynar® 2800 | 15% Silicone | 3950 | 248.8 | 70155 |
| Kynar® 2800 | 20% Silicone | 3820 | 299.0 | 66644 |
| Kynar® 2800 | 25% Silicone | 4000 | 312.0 | 65178 |
| Kynar® 2500 | 0% Silicone | 3743 | 843.7 | 36101 |
| Kynar® 2500 | 5% Silicone | 4498 | 939.0 | 38765 |
| Kynar® 2500 | 10% Silicone | 4385 | 810.2 | 39473 |
| Kynar® 2500 | 15% Silicone | 4349 | 753.1 | 41585 |
| Kynar® 2500 | 20% Silicone | 4400 | 684.2 | 44088 |
| Kynar® 2500 | 25% Silicone | 4031 | 571.6 | 44609 |

Example 2

Effects of CSIM Containing a Silicone Core on Low Temperature Izod Impact Strength The cold temp Izod testing is performed based on ASTM D256 (Standard Test Methods for Determining the Izod Pendulum Impact Resistance of Plastics). This method uses ⅛" Flex Bars cut down to 2.5" length and notched. The hammer used is the 7.5 J on the CEAST Resil Impact Tester. The specimens were clamped into the pendulum impact test fixture with the notched side facing the striking edge of the pendulum. The pendulum was released and allowed to strike through the specimen. If breakage did not occur, the temperature was lowered in 10° C. increments until 100% brittle failure occurs. The specimens were conditioned at the specified temperature in a freezer until they reached equilibrium. The specimens were quickly removed, one at a time, from the freezer and impacted. Specimens were conditioned at the temperature for a minimum of 4 hours and took 5 to 8 seconds from freezer to impact. DBTT was determined by interpolating between the highest "brittle" failure temperature and the "lowest" ductile mode failure temperature. The silicone core-shell impact modifier used was Genioperl® P52, supplied by Wacker Chemie. This CSIM has an outer particle diameter of approximately 200 nm, and a silicone core content of about 65% by weight.

| Genioperl® P52 Loading (%) | 0 | 5 | 10 | 15 | 20 |
|---|---|---|---|---|---|
| DBTT (° C.) For Kynarflex® 2850-00 | 10 | −10 | −15 | −30 | −35 |
| DBTT (° C.) For Kynarflex® 2800-00 | 0 | −10 | −20 | −35 | −40 |
| DBTT (° C.) For Kynarflex® 2750-01 | −5 | −15 | −30 | −40 | −45 |
| DBTT (° C.) For Kynarflex® 2500 | −5 | −15 | −25 | −45 | −50 |

Example 3

Effects of Silicone CSIM on Low Temperature Izod Impact Strength

Kynarflex® 3121-50 PVDF powder was blended with 0, 10, 15 and 20% Genioperl® P52 CSIM using a high speed Merlin® mixer. A Leistritz 18 mm twin screw compounding extruder was used to prepared pellets for each of these blends. Pellet samples were converted into plaques (6 inches×6 inches×0.125 inches) by compression molding in a stainless steel press fixture at 232° C. for 10 minutes at 10,000 psi. Test specimens were die cut into 2.5 inch×0.5 inch samples and then notched to produce a standard Notched-Izod test sample. Low temperature Izod testing was performed following the procedures described in ASTM D256 "Standard Test Methods for Determining the Izod Pendulum Impact Resistance of Plastics" using a 7.5 J hammer. The notched specimens were clamped into the pendulum impact test fixture with the notched side facing the striking edge of the pendulum. The test fixture clamp was cooled using dry ice to prevent warming of the notched specimens while retained in the clamp. The pendulum was released and allowed to strike through the specimen. Testing started by conditioning the samples at −10° C. for a minimum of 4 hours. The specimens were quickly removed and tested within 8 seconds from freezer to impact. The data was collected and reported as percent impact failure as a function of sample and temperature.
Testing was continued at lower temperatures for all samples having at least one non-break. Freezer temperature was lowered in 10° C. increments down to −50° C. with impact tests being repeated at each temperature. The Ductile Brittleness Temperature (DBTT) was determined by extrapolating the temperature at which 50% breakage would occur.

| % Kynarflex® | % Genioperl® | % Failure @ Temperature (° C.) | | | | | DBTT |
|---|---|---|---|---|---|---|---|
| 3120-50 | P52 | −10 | −20 | −30 | −40 | −50 | (° C.) |
| 100 | 0 | 0 | 100 | 100 | 100 | 100 | −15 |
| 90 | 10 | 0 | 0 | 100 | 100 | 100 | −25 |
| 85 | 15 | 0 | 0 | 0 | 0 | 0 | <−50 |
| 80 | 20 | 0 | 0 | 0 | 0 | 0 | <−50 |

Example 4

Effects of Silicone CSIM on Low Temperature Cable Impact Strength

Resin compositions were prepared by blending Kynarflex® 2521 powder with Genioperl® P52 CSIM using a high-speed Merlin® mixer. A Leistritz 18 mm twin screw compounding extruder was used to prepare pellets for each of these blends. The pellet samples were converted into cable jacketing using a lab cable extrusion line consisting of a 1.5 inch general purpose Davis Standard extruder, a B&H cross-head (BH30), water tank, pay-off and take up. Tooling was sized to provide a draw down ratio of 9:1, a draw balance of 1.0, and a jacket thickness of 0.015 inches. The cable core consisted of a 4 twisted pair communication cable insulated with fluorinated ethylene-propylene (FEP). The jacketed cables were tested for low temperature impact properties per ICEA.S.104.696 "Standard for Indoor-Outdoor Optical Fiber Cable". This test is performed by placing a cable into a drop dart impact fixture providing an impact energy of 2.9 N.M. Impacts are performed using 12 inch cables sections tested two times at each of three locations spaced approximately 150 mm apart. The cables are placed into a freezer (set at the desired temperature) for 12 hours minimum. The impact fixture is also conditioned within a separate freezer also set at the desired temperature. Impacts are performed by removing the cable from the first freezer and then inserting the cable into the impact fixture contained in the second freezer. The time needed to complete impact testing for each cable is typically about 10 seconds after removal. The cables were allowed to come to room temperature, then visually inspected (no magnification) for cracks in the cable. Data are reported as % cable failures at the specified temperature.

Impact testing indicates that the low temperature brittleness of Kynarflex® 2500-20 can be lowered from 10° C. to a temperature below −20° C. with the addition of 10% Genioperl® P52 CSIM.

| Kynarflex® 2500-20 Composition | | | | | | |
|---|---|---|---|---|---|---|
| % PVDF | % Genioperl® P52 | % FR | % Failure @ Temperature (° C.) | | | |
| | | | 10 | 0 | −10 | −20 |
| 100 | 0 | 0 | 0 | 100 | 100 | 100 |
| 95 | 5 | 0 | 0 | 0 | 33 | 100 |
| 92.5 | 7.5 | 0 | 0 | 0 | na | 0 |
| 90 | 10 | 0 | 0 | 0 | 0 | 0 |

Example 5

Effects of Silicone CSIM on Low Temperature Cable Impact Strength

Resin compositions were prepared by blending Kynarflex® 3121-50 powder with Genioperl® P52 CSIM and calcium tungstate powder from Chem-Met using a high-speed Merlin® mixer. A Leistritz 18 mm twin screw compounding extruder was used to prepared pellets for each of these blends. The pellet samples were then converted into cable jacketing using a lab cable extrusion line consisting of a 1.5 inch general purpose Davis Standard extruder, a B&H cross-head (BH30), water tank, pay-off and take up. Tooling was sized to provide a draw down ratio of 9:1, a draw balance of 1.0, and a jacket thickness of 0.015 inches. The cable core consisted of a 4 twisted pair communication cable insulated with fluorinated ethylene-propylene (FEP). The jacketed cables were tested for cold impact per UL 2556 "Wire and Cable Test Methods". This test is performed using a single drop of a 3 lb flat faced dart at an impact height of 36 inches. Cable sections are cut into 12 inches lengths and each attached using a staple gun to a spruce mandrel (1.75 inches×3.5 inches×10 inches). The spruce mandrel (with attached cable) is placed into a freezer set at −40° C. for 12 hours minimum. Impacts are performed by removing the mandrel from the freezer, placing it in the impact fixture, and immediately dropping the dart to strike the center of the cable within 8 seconds from freezer to impact. The cables allowed to come to room temperature then visually inspected (no magnification) for cracks in the cable. Data is reported as a pass (no visible cracks) or fail at the specified temperature.

Surprisingly, the impact testing indicates that Kynarflex® 3120-50 containing 20% Genioperl® P52 CSIM is capable of meeting the −40° C. cable impact requirements per UL 2556.

| Sample # | % Kynar® 3120-50 | % FR | % Genioperl® P52 | Results | Observations |
|---|---|---|---|---|---|
| Control | 100 | 0 | 0 | Fail | Brittle Failure |
| RC 10,303 | 80 | 0 | 20 | Pass | No Cracks |

Example 6

Effects of Silicone CSIM on −40 C Low Temperature Cable Impact Performance

Blend compositions were prepared by blending Kynarflex® 3121-50 powder with Genioperl® P52 CSIM and calcium tungstate powder from Chem-Met using a high-speed Merlin® mixer. A Leistritz 18 mm twin screw compounding extruder was used to prepared pellets for each of these powder blends. The pellet samples were converted into cable jacketing using a lab cable extrusion line consisting of a 1.5 inch general purpose Davis Standard extruder, a B&H cross-head (BH30), water tank, pay-off and take up. Tooling was sized to provide a draw down ratio of 9:1, a draw balance of 1.0, and a jacket thickness of 0.015 inches. The cable core consisted of a 4 twisted pair communication cable insulated with fluorinated ethylene-propylene (FEP). The jacketed cables were tested for low temperature impact properties per ICEA.S.104.696 "Standard for Indoor-Outdoor Optical Fiber Cable". This test is performed by placing a cable into a drop dart impact fixture providing an impact energy of 2.9 N.M. Impacts are performed using 12 inch cables sections tested two times at each of three locations spaced approximately 150 mm apart. The cables are placed into a freezer (set at the desired temperature) for 12 hours minimum. The impact fixture is also conditioned within a separate freezer also set at the desired temperature. Impacts are performed by removing the cable from the first freezer and then inserted into the impact fixture contained in the second freezer. The time needed to complete impact testing for each cable is typically about 10 seconds after removal. The cables allowed to come to room temperature then visually inspected (no magnification) for cracks in the cable. Data is reported as % cable failures at the specified temperature.

Impact testing indicates that the low temperature impact of Kynarflex® 3120-50 is adversely affected by the addition of calcium tungstate. When calcium tungstate is added to Kynarflex® 3120-50 at a 1.5% level, the low temperature impact is shifted from −20° C. to 0° C. The addition of Genioperl® P52 CSIM was found to be effective at improving low temperature impact properties of Kynarflex® 3120-50 containing calcium tungstate. In this test, low temperature impact was shifted from 0° to −30° C. with the addition of 20% Genioperl® P52 CSIM.

| Kynarflex® 3120-50 Composition ||| % Failure @ Temperature (° C.) ||||
|---|---|---|---|---|---|---|
| % PVDF | % CaWO$_4$ | % Genioperl® P52 | 0 | −10 | −20 | −30 |
| 100 | 0 | 0 | 0 | 0 | 0 | 100 |
| 98.5 | 1.5 | 0 | 0 | 66.7 | 100 | 100 |
| 78.5 | 1.5 | 20 | 0 | 0 | 0 | 0 |

Example 7

UV Resistance, Weathering and Clarity

Blends of Kynarflex® 2750-01 containing 10 and 20% Genioperl® P52 were prepared in a 18 mm Leistritz twin screw extruder and converted to 25 mil thick sheets. Plaques prepared from these sheets were used to investigate the UV resistance and clarity of these blends. Neat Kynarflex® 2750-01 was used as control.

Weathering was done in a QUV accelerating weathering chamber using QUVA 340 lamps with the exposure specifications of an irradiance of 1.55 W/m$^2$ at 340 nm and the cycling is 8 hours of irradiance at 60° C. followed by 4 hours condensation at 50° C. based on the ASTM G154 Cycle 4. Color readings were done by using Macbeth Color Eye 7000A using Specular Included Transmission Mode, Cielab D65 using ASTM D2244 and Gloss with BYK micro meter using ASTM D523. Yellowness Index was measured using ASTM 1925 and a BYK HazeGuard Plus instrument was used to measure light transmission using ASTM D1003.

| Sample ID | Exposure Time (hrs) | L* | a* | b* | YI | 60° Gloss | 60° Gloss Retention (%) | Transmission (%) |
|---|---|---|---|---|---|---|---|---|
| 2750-01 | 0 | 95.7 | 0.2 | 0.5 | 1.0 | 66.1 | 100% | 92.2% |
| control | 2068 | 94.8 | 0.3 | 0.4 | 1.0 | 66.4 | 100% | 89.7% |
|  | 5254 | 88.4 | 0.5 | 1.0 | 2.5 | 65.3 | 99% | 77.6% |
| 2750-01 + 10% | 0 | 86.2 | 1.6 | 10.3 | 21.6 | 64.8 | 100% | 72.3% |
| Genioperl® | 2068 | 90.4 | 1.1 | 3.4 | 7.6 | 63.6 | 98% | 77.7% |
| P52 IM | 5254 | 90.2 | 1.1 | 3.6 | 7.9 | 65.6 | 101% | 79.6% |
| 2750-01 + 20% | 0 | 81.0 | 3.4 | 19.1 | 40.5 | 63.4 | 100% | 61.8% |
| Genioperl® | 2068 | 88.9 | 1.6 | 5.3 | 11.8 | 62.6 | 99% | 76.9% |
| P52 IM | 5254 | 89.2 | 1.5 | 5.3 | 11.8 | 63.2 | 100% | 78.7% |

As can be seen from the above data, this blend has an excellent UV resistance as represented by color and gloss change. Surprisingly, the light transmission of these compounds containing up to 20% by weight of impact modifier show light transmission equal to that of pure Kynar® 2750. In addition, the properties after accelerated UV aging are well maintained.

Comparative Example 8

Blends of Kynar® 2800-20 with three types of core-shell impact modifiers were prepared and tested. Clearstrength® E920 is an MB S-type material manufactured by Arkema with a polybutadiene core and PMMA shell. Durastrength® D200 is an all acrylic CSIM with a polybutylacrylate core and PMMA shell, also manufactured by Arkema. Genioperl® P52 is an impact modifier with silicone core and PMMA shell manufactured by Wacker Chemie. The modifiers were blended into the Kynar® 2800-20 at 20% by weight in a twin screw extruder. The testing that was conducted includes tensile and elongation (T&E), flexural modulus, cold temperature impact resistance, color change at elevated temperature, weathering, and UL94 flammability testing Results and Discussion:
Tensile and Flex Based on the data, Genioperl® P52 has surprisingly superior tensile strength and modulus retention compared with the other two impact modifiers when blended into vinylidene fluoride polymers. Especially surprising is the higher stress at break vs. standard Kynar® 2800-20.

| Samples | Tensile and Elongation | | | |
|---|---|---|---|---|
| | Stress at Break (psi) | Strain at Break (%) | Automatic Young's Modulus (psi) | Flex Modulus (Automatic) (psi) |
| Kynar® 2800-20 Control | 3930 | 609.6 | 92959 | 74850 |
| Kynar® 2800-20 + 20% Genioperl® P52 | 4404 | 490.3 | 79152 | 67290 |
| Kynar® 2800-20 + 20% Clearstrength® E920 | 3356 | 521.2 | 64398 | 53160 |
| Kynar® 2800-20 + 20% Durastrength® D200 | 3056 | 411.0 | 67708 | 48074 |

Cold Temperature Impact Resistance

The results for the cold temperature impact testing indicated that the ductile/brittle transition temperature (DBTT) is shown below. All improve DBTT, however the others degrade weathering, strength or chemical resistance properties when compared to the silicone core-shell impact modifier. An important note about the Genioperl® P52 DBTT is that partial breaks were obtained from −30° C. down to −60° C.

| | 2800-20 (lot # 14C8143) | 2800-20 + 20% P52 | 2800-20 + 20% E920 | 2800-20 + 20% D200 |
|---|---|---|---|---|
| DBTT | 15° C. | −35° C. | −50° C. | −25° C. |

Accelerated Weathering, Light Transmission and Haze

A 500 hour QUVA weathering exposure (ASTM G154, Cycle 6) as described in example 7 was used to evaluate the weathering of the compounds with these different impact modifiers. Yellowness Index (ASTM 1925) was tested to look at color stability while a BYK Hazeguard Plus instrument following ASTM D1003 was used to measure Haze and Light Transmission. The results are listed in the table below on film samples that are 0.015 inches thick.

As can be seen from the table, addition of the impact modifier (E920-MBS based or D200-Acrylic based) increases to nearly 100% and drops light transmission by 30 to 60%. Surprisingly, however the blend with Genioperl® P52 light transmission is greater than 75% and after weathering actually increases to 85%, while the haze only increases to 20%. This shows the surprising results or this invention compared with standard CSIM available in the industry today.

Furthermore, the E920-containing blend yellows dramatically as noted in the table with the yellow index increasing to over 80, while the blend with Genioperl® P52 (this invention)—sees a drop in yellowness index to only ~11 after accelerated weathering. This is also surprising and novel.

| QUVA Exposure Data | | | | | | | |
|---|---|---|---|---|---|---|---|
| Sample | Hours | L* | a* | b* | YI | Haze (%) | Transmission (%) |
| 2800-20 control | 0 | 97.43 | 0.03 | 0.31 | 0.62 | 4.4 | 94.9 |
| | 507 | 97.47 | 0.05 | 0.21 | 0.43 | 4.3 | 95.0 |
| 2800-20 + 20% Genioperl® P52 | 0 | 88.63 | 1.43 | 12.27 | 24.67 | 20.5 | 76.9 |
| | 507 | 92.58 | 0.82 | 5.36 | 10.94 | 22.5 | 85.0 |
| 2800-20 + 20% Clearstrength® E920 | 0 | 59.86 | 1.47 | 13.95 | 37.09 | 101.0 | 32.0 |
| | 507 | 54.97 | 3.2 | 35.84 | 83.67 | 101 | 26.2 |
| 2800-20 + 20% Durastrength® D200 | 0 | 81.15 | 1.44 | 6.51 | 15.10 | 92.6 | 63.3 |
| | 507 | 79.3 | 1.7 | 7.17 | 16.99 | 93.2 | 61.0 |

Example 9

Chemical Resistance

Blends of Kynarflex® 2750-01 containing 5, 10, 15 and 20% Genioperl® P52 were prepared in an 18 mm Leistritz twin screw extruder and injection molded into type I tensile bars. A 1 and 3 month chemical resistance study was conducted on these specimens with the following chemicals: 37% Hydrochloric Acid, Fuel C, Fuel CE15, and Chlorine (3000 ppm in water). The goal of this extended exposure was to investigate the chemicals' effects on tensile property retention.

Test Method:

Type I tensile specimens were exposed at 40° C. temperature to each chemical at 1 month and 3 month time intervals. A small hole was drilled into the tab of each specimen. Groups of five specimens were bundled together using a small wire. It is important to note that the bundles were prepared in such a way that each individual specimen had the freedom to move. These groups were labeled with a stamped metal tag according to the respective material. The bundled sets were then placed into a stainless steel pressure vessel and filled with approximately three-quarters of a gallon of chemical. The vessels were sealed and placed in an explosion-proof oven.

Test Procedure:

Method: ASTM D638, Speed: 2"/min, Initial Grip Separation: 4.5". Intron Model 4202 with a 2000 lb load cell.

The vessels were removed from the oven and allowed to cool for 2 hours at ambient temperature. Fuel was transferred to 2 quart glass jars and specimen bundles were placed in each jar. Specimens were removed from the jar in the physical testing lab one at a time and were loaded in the test machine after quickly drying them with a paper towel.

The resistance of the blend compositions to fuels was very good. There was no degradation as the result of HCl exposure even after three months. The observed initial reductions of the tensile properties were due to the softening of the material as the result of silicone rubber addition. In the case of the fuel exposure, reduction of properties is due to plasticization of the material and is reversible after fuel evaporation. The fact that curves with various levels of CSIM are parallel and proportional to the amount of the additives shows that there is no material degradation.

Example 10

Flame Resistance

Blends of Kynarflex® 3120-50 containing 10, 15 and 20% Genioperl® P52 were prepared in a 18 mm Leistritz twin screw extruder as previously described and compression molded into 3.9 mm sheets. The sheets were die cut into samples having the dimensions of 0.5 inches by 5 inches.

| Sample # | % K3120-50 | % Genioperl ® P52 | UL94 V Rating |
|---|---|---|---|
| 1 | 100 |  | V0 |
| 2 | 90 | 10 | V0 |
| 3 | 85 | 15 | V0 |
| 4 | 80 | 20 | V0 |

Samples were submitted for evaluation of flammability under UL94 "Test for Flammability of Plastic Materials for Parts in Devices and Applications". This standard contains several methods for evaluating the flammability of plastics, with the vertical burn test more difficult to pass then the horizontal burn tests. To achieve a V0 rating, the samples must have an after flame time below 10 seconds and an afterglow time below 30 seconds and cannot drip flaming particles. Surprisingly, it was found that even with 20 weight % of this impact modifier the blend maintained the V0 rating. It is generally understood that PVDF's resistance to burning can be negatively impacted by blending flammable materials such as typical CSIMs containing acrylic polymer and polybutadiene.

Examples 11

Latex Blending

Into an 80-gallon stainless steel reactor was charged, 345 lbs of deionized water, 250 grams of PLURONIC 31R1 (non-fluorinated non-ionic surfactant from BASF), and 0.3 lbs of propane. Following evacuation, agitation was begun at 23 rpm and the reactor was heated. After the reactor temperature reached the desired set point of 100° C., the vinylidene fluoride (VDF) charge was started. Reactor pressure was then raised to 650 psi by charging approximately 35 lbs VDF into the reactor. After reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 70 pounds per hour. The VDF homopolymerization was continued until approximately 150 pounds VDF was introduced in the reaction mass. The VDF feed was stopped and the batch was allowed to react-out at the reaction temperature to consume residual monomer at decreasing pressure. After 25 minutes, the agitation was stopped and the reactor was cooled, vented and the latex recovered. Solids in the recovered latex were determined by gravimetric technique and were about 27 weight % and melt viscosity of about 27 kp according to ASTM method D-3835 measured at 450° F. and 100 $sec^{-1}$. The melting temperature of resin was measured in accordance with ASTM method D-3418 and was found to be about 162° C. The weight average particle size was measured by NICOMP laser light scattering instrument and was found to be about 150 nm.

Figure 2:
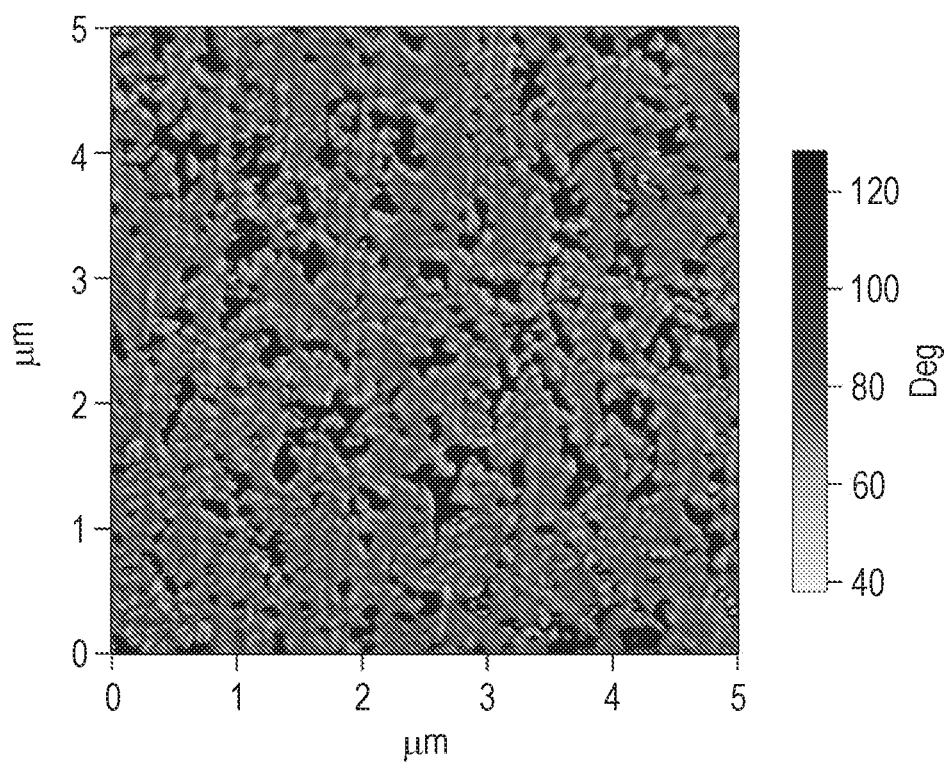
FIG. 2: Is an AMF of the spray-dried powder blend of Example 11 (silicon particles without any shell) after melt processing.

This PVDF latex was blended with a silicon latex from Wacker which is pure silicon latex and does not have an acrylic shell, mixed at 75/25 ratio (fluoropolymer/silicon) after thoroughly blending the two products in latex form and then the blend was spray dried using a Niro spray drier to a moisture content of <0.3% moisture. The resulting powder is shown in FIG. 1 which is an SEM picture of the blended spray-dried latexes. FIG. 2, is an AFM following melt processing of the blend, the melt processing being blending in a Brabender mixer at about 240° C., followed by compression molding at 230° C.

Both fluoropolymer and silicon particles are intact and well-dispersed after drying. In the AFM picture, agglomeration of silicone particles are noticed after melt processing of the same sample.

Examples 12

Latex Blending

Into an 80-gallon stainless steel reactor was charged, 345 lbs of deionized water, 250 grams of PLURONIC 31R1 (non-fluorinated non-ionic surfactant from BASF), and 0.6 lbs of ethyl acetate. Following evacuation, agitation was begun at 23 rpm and the reactor was heated. After the reactor temperature reached the desired set point of 100° C., the VDF and HFP monomer were introduced to reactor with HFP ratio of 40 wt % of total monomers. Reactor pressure was then raised to 650 psi by charging approximately 35 lbs total monomers into the reactor. After reactor pressure was stabilized, 5.0 lbs of initiator solution made of 1.0 wt % potassium persulfate and 1.0 wt % sodium acetate were added to the reactor to initiate polymerization. Upon initiation, the ratio of HFP to VDF was so adjusted to arrive at 16.5% HFP to total monomers in the feed. The rate of further addition of the initiator solution was also adjusted to obtain and maintain a final combined VDF and HFP polymerization rate of roughly 70 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 28 kp according to ASTM method D-3835 measured at 450° F. and 100 sec$^{-1}$. The melting temperature of resin was measured in accordance with ASTMD3418 and was found to be about 120° C. The weight average particle size was measured by NICOMP laser light scattering instrument and was found to be about 160 nm.

Figure 3:
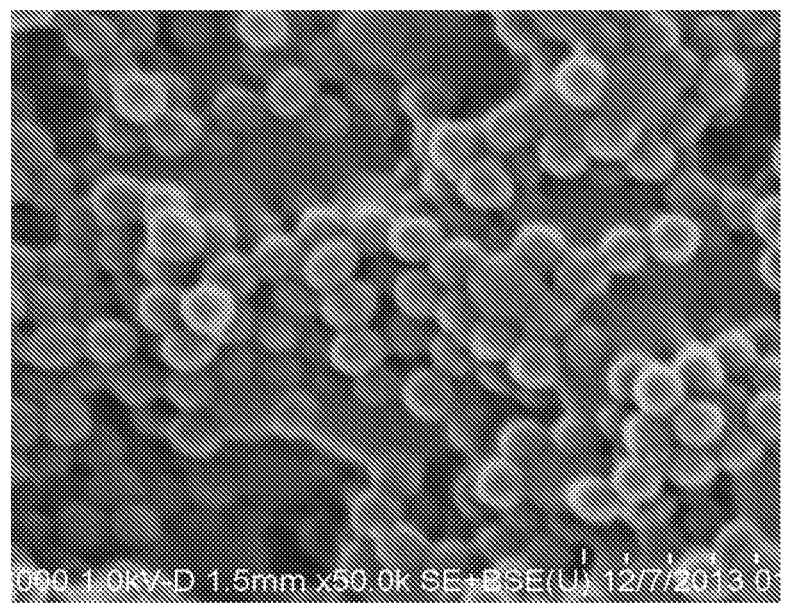
FIG. 3: Is an SEM of the spray-dried powder blend of Example 12 (silicon particles having an acrylic shell)
Figure 4:
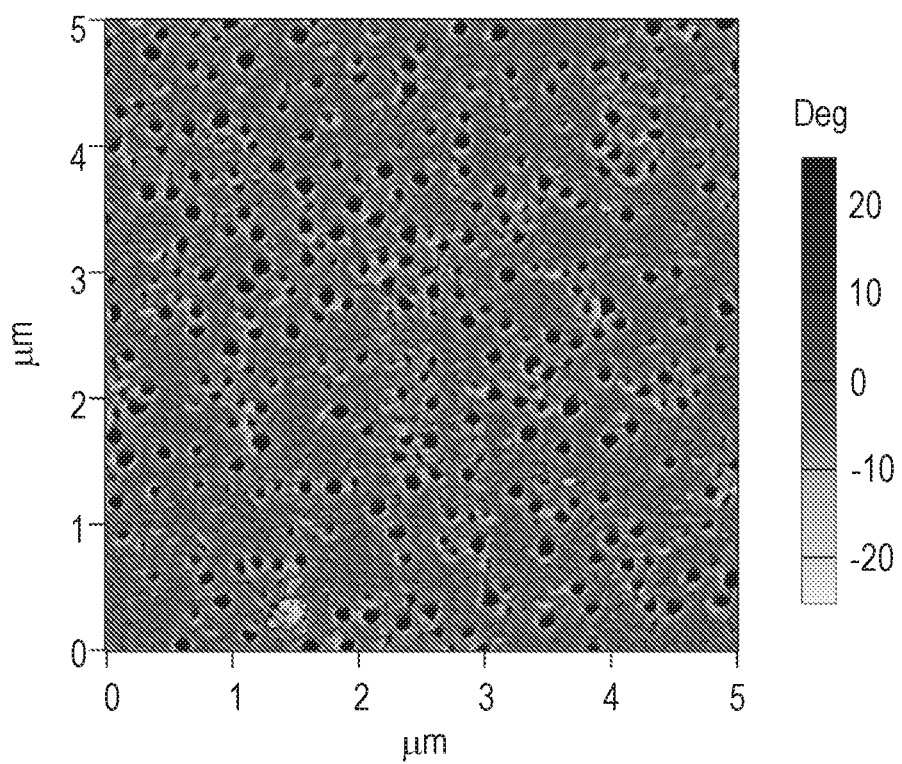
FIG. 4: Is an AMF of the spray-dried powder blend of Example 12 (silicon particles having an acrylic shell) after melt processing.

This PVDF latex was blended with a latex of a core-shell silicon product (from WACKER), where the core is pure silicon and the shell is acrylic, mixed at 75/25 ratio (fluoropolymer/silicon) after thoroughly blending the two products in latex form and then the blend was spray dried using a Niro spray drier to a moisture content of <0.3% moisture. The resulting powder is shown in FIG. 3 which is an SEM picture of the blended spray-dried latexes. FIG. 4, is an AFM following melt processing of the blend, the melt processing being blending in a Brabender mixer at about 240° C., followed by compression molding at 230° C.

Both fluoropolymer and silicon particles are intact and well-dispersed with each other after drying. In the AFM picture, well dispersed silicone particles can be seen after melt processing of the same sample.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:
1. A resin composition comprised of a vinylidene fluoride-containing polymer, preferably a vinylidene fluoride copolymer, and a core-shell impact modifier comprised of a polysiloxane core and a shell of a non-elastomeric polymeric material compatible with the vinylidene fluoride-containing polymer, preferably a acrylate containing shell, wherein the resin composition additionally has at least one of characteristics a), b), c) or d):
   a) the resin composition is additionally comprised of at least one flame and smoke suppressant;
   b) the vinylidene fluoride-containing polymer is a heterogeneous copolymer composition comprised of two or more distinct phases;
   c) the vinylidene fluoride-containing polymer is in the form of a powder having distinct particles having a weight average particle size on less than 500 nm, or agglomerate particles in the range of 0.5 to 200 microns;
   d) the resin composition is in the form of an aqueous dispersion.
2. The resin composition of aspect 1, wherein the vinylidene fluoride-containing polymer is a copolymer of vinylidene fluoride.
3. The resin composition of aspects 1 or 2, wherein the resin composition is comprised of 60 to 98 parts by weight vinylidene fluoride-containing polymer and 2 to 40 parts by weight core-shell impact modifier, the total amount of vinylidene fluoride-containing polymer and core-shell impact modifier being 100 parts by weight.
4. The resin composition of any of aspects 1 to 3, wherein the shell is an acrylate-containing shell.
5. The resin composition of any of aspects 1 to 4, wherein the shell is cross-linked and/or is comprised of a polymer having one or more types of functional groups selected from the group consisting of epoxy functional groups, anhydride functional groups and carboxylic acid functional groups.
6. The resin composition of any of aspects 1 to 5, wherein the vinylidene fluoride-containing polymer is a heterogeneous copolymer composition comprised of two or more distinct phases, including a polyvinylidene fluoride continuous phase and a non-continuous or co-continuous phase comprised of a copolymer of vinylidene fluoride and at least one comonomer.
7. The resin composition of any of aspects 1 to 6, wherein the core-shell impact modifier has a primary particle size of from 10 to 500 nm.
8. The resin composition of any of aspects 1 to 7, wherein the core-shell impact modifier is comprised of 50 to 90 parts by weight polysiloxane core and 10 to 50 parts by weight shell, the total amount of polysiloxane core and shell being 100 parts by weight.
9. The resin composition of any of aspects 1 to 8, wherein the polysiloxane is a polydimethylsiloxane.
10. The resin composition of any of aspects 1 to 9, comprising at least one flame and smoke suppressant.
11. The resin composition of any of aspects 1 to 10, comprising at least one flame and smoke suppressant selected from the group consisting of tungstates, silicates, molybdates and phosphorus-containing compounds.
12. The resin composition of any of aspects 1 to 11, additionally comprising at least one plasticizer.
13. An article containing the resin compound of any of aspects 1 to 12, wherein said article is selected from the group consisting of wires, cables, conduit, piping, tanks, pumps, tubing, coatings, tower packing, solar panels, permeable membranes, batteries, lined vessels, nozzles, valves, resin-coated metal articles, electrical and electronic devices and fabrics.
14. The article of aspect 13, wherein said article is a wire or cable, and wherein the resin composition is comprised of at least one flame and smoke suppressant.
15. A method of making the resin composition of any of aspects 1 to 12, wherein the method comprises compounding the vinylidene fluoride-containing polymer and the core-shell impact modifier by melt processing, dry blending powders of the vinylidene fluoride-containing polymer and the core-shell impact modifier, or blending a latex of the vinylidene fluoride-containing polymer and a latex of the core-shell impact modifier.
16. The method of making the resin composition of aspect 15, wherein said blended latex is further spray dried to form an intimate powder blend of the vinylidene fluoride-containing polymer and the core-shell impact modifier.

What is claimed is:
1. An article comprising a resin composition wherein said article is selected from the group consisting of wires, cables, conduit, tanks, pumps, tubing, coatings, batteries, valves, resin-coated metal articles, electrical and electronic devices, wherein the article is an injection molded or extruded article, and wherein the resin composition comprised of at least one vinylidene fluoride-containing polymer and a core-shell impact modifier, the core shell impact modifier consisting of a polysiloxane core and a shell of a non-elastomeric polymeric material compatible with the at least one vinylidene fluoride-containing polymer,
   wherein the resin composition optionally comprised of at least one flame and smoke suppressant;

wherein the article exhibits improved low temperature impact performance at −10 C as measured by ASTM D256, wherein at least one vinylidene fluoride-containing polymer in the resin composition is a copolymer of vinylidene fluoride and is comprised of at least 70% by weight of vinylidene fluoride units; and wherein the polysiloxane core comprises from 60 to 80% by weight of the core shell impact modifier.

2. The article of claim 1, wherein the resin composition is comprised of 60 to 98 parts by weight vinylidene fluoride-containing polymer and 2 to 40 parts by weight core-shell impact modifier, the total amount of vinylidene fluoride-containing polymer and core-shell impact modifier being 100 parts by weight.

3. The article of claim 1, wherein the shell is an acrylate-containing shell.

4. The article of claim 1, wherein the shell is cross-linked and/or is comprised of a polymer having one or more types of functional groups selected from the group consisting of epoxy functional groups, anhydride functional groups and carboxylic acid functional groups.

5. The article of claim 1, wherein the resin composition comprised of at least one vinylidene fluoride-containing polymer comprises a heterogeneous copolymer composition comprised of two or more distinct phases, including a polyvinylidene fluoride continuous phase and a non-continuous or co-continuous phase comprised of a copolymer of vinylidene fluoride and at least one comonomer.

6. The article of claim 1, wherein the core-shell impact modifier has a primary particle size of from 10 to 500 nm.

7. The article of claim 1, wherein the polysiloxane is a polydimethylsiloxane.

8. The article of claim 1, comprising at least one flame and smoke suppressant.

9. The article of claim 1, comprising at least one flame and smoke suppressant selected from the group consisting of tungstates, silicates, molybdates and phosphorus-containing compounds.

10. The article of claim 1, additionally comprising at least one plasticizer.

11. The article of claim 1, wherein said article is a wire or cable and wherein the resin composition is comprised of at least one flame and smoke suppressant.

12. A method of making a resin composition, the resin composition comprising a vinylidene fluoride-containing polymer and a core-shell impact modifier comprised of a polysiloxane core and a shell of a non-elastomeric polymeric material compatible with the vinylidene fluoride-containing polymer, and optionally comprising of at least one flame and smoke suppressant, wherein the method comprises blending a latex of the vinylidene fluoride-containing polymer and a latex of the core-shell impact modifier.

13. The method of making the resin composition of claim 12, wherein said blended latex is further spray dried to form an intimate powder blend of the vinylidene fluoride-containing polymer and the core-shell impact modifier.

14. An article comprising a resin composition wherein said article is selected from the group consisting of wires, cables, conduit, tanks, pumps, tubing, coatings, batteries, valves, resin-coated metal articles, electrical and electronic devices wherein the article is an injection molded or extruded article, and wherein the resin composition comprises a vinylidene fluoride containing heterogeneous copolymer composition and a core-shell impact modifier comprising a polysiloxane core and a shell of a non-elastomeric polymeric material compatible with the vinylidene fluoride-containing heterogeneous copolymer composition;

wherein the resin composition optionally comprised of at least one flame and smoke suppressant;

wherein the article exhibits improved low temperature impact performance at −10 C as measured by ASTM D256; and wherein the heterogeneous copolymer composition is comprised of at least 70% by weight of vinylidene fluoride units.

15. The article of claim 14, wherein the shell is an acrylate-containing shell.

16. The article of claim 14, wherein the polysiloxane is comprised of repeating units corresponding to the structure [OSiR$^1$R$^2$], wherein R$^1$ and R$^2$ are the same or different and are C1-C6 alkyl groups or aromatic groups.

17. The article of claim 14, wherein the polysiloxane is a polydimethylsiloxane.

* * * * *